United States Patent

Hogge et al.

[11] Patent Number: 6,124,781
[45] Date of Patent: Sep. 26, 2000

[54] CONDUCTIVE POLYMER PTC BATTERY PROTECTION DEVICE AND METHOD OF MAKING SAME

[75] Inventors: Steven D. Hogge, Aptos, Calif.; Andrew Brian Barrett, Douglas, Ireland

[73] Assignee: Bourns, Inc., Riverside, Calif.

[21] Appl. No.: 09/408,110

[22] Filed: Sep. 29, 1999

Related U.S. Application Data

[60] Provisional application No. 60/103,256, Oct. 6, 1998.

[51] Int. Cl.$^7$ ...................................................... H01C 7/10
[52] U.S. Cl. ...................... 338/22 R; 338/328; 338/331; 429/7; 429/9
[58] Field of Search ............................ 338/22 R, 22 SD, 338/328, 331; 429/7, 11, 62

[56] References Cited

U.S. PATENT DOCUMENTS

| | | | |
|---|---|---|---|
| 2,382,024 | 8/1945 | Priessman | 201/63 |
| 2,777,039 | 1/1957 | Thais | 201/63 |
| 2,994,846 | 8/1961 | Quinn | 338/308 |
| 3,467,937 | 9/1969 | Norton | 338/219 |
| 3,657,692 | 4/1972 | Wormser | 338/252 |
| 3,775,725 | 11/1973 | Endo | 338/262 |
| 4,426,633 | 1/1984 | Taylor | 338/25 |
| 4,725,925 | 2/1988 | Tanaka et al. | 361/406 |
| 4,787,135 | 11/1988 | Nagahori | 29/612 |
| 4,937,551 | 6/1990 | Plasko | 338/22 R |
| 4,973,936 | 11/1990 | Dimpault-Darcy et al. | 338/32 R |
| 5,089,801 | 2/1992 | Chan et al. | 338/22 R |
| 5,216,404 | 6/1993 | Nagai et al. | 338/22 SD |
| 5,801,612 | 9/1998 | Chandler et al. | 338/22 R |
| 5,802,709 | 9/1998 | Hogge et al. | 29/827 |
| 5,831,510 | 11/1998 | Zhang et al. | 338/22 R |
| 5,852,397 | 12/1998 | Chan et al. | 338/22 R |
| 5,856,773 | 1/1999 | Chandler et al. | 338/22 R |
| 5,900,800 | 4/1999 | McGuire et al. | 338/22 R |

FOREIGN PATENT DOCUMENTS

| | | |
|---|---|---|
| 0844622 | 5/1998 | European Pat. Off. . |
| 0853323 | 7/1998 | European Pat. Off. . |
| 5325942 | 12/1993 | Japan . |
| 9213505 | 8/1997 | Japan . |
| 10-188947 | 7/1998 | Japan . |
| 93/14612 | 7/1993 | WIPO . |
| 95/08176 | 3/1995 | WIPO . |
| 97/06660 | 2/1997 | WIPO . |
| 99/14814 | 3/1999 | WIPO . |

*Primary Examiner*—Karl D. Easthom
*Attorney, Agent, or Firm*—Klein & Szekeres, LLP

[57] ABSTRACT

A battery protection device includes an upper foil electrode laminated to the upper surface of a conductive polymer PTC layer, and a lower foil electrode laminated to the lower surface of the PTC layer. An isolated portion of the lower electrode is formed by creating an annular isolation gap in the lower electrode. A first via is formed through the upper electrode, the PTC layer, and the isolated portion of the lower electrode. The diameter of the first via is smaller than the diameter of the isolated electrode portion, so that an annular area of the isolated electrode portion is left between the opening and the isolation gap. The internal wall surface of the first via and the annular electrode area are plated with a conductive metallization layer, which forms a first contact seat that is conductively connected by the metallized surface of the first via with the upper electrode. A first contact element is fixed to the first contact seat. An area of the lower electrode, spaced from the isolated portion, is metal-plated. A second via is formed through the upper electrode, the PTC layer, and the metal-plated area of the lower electrode, with an opening in the metal-plated area. The diameter of the second via is smaller than that of the metal-plated area, so that a second contact seat is defined around the opening of the second via in the metal-plated area, to which a second contact element is fixed.

4 Claims, 3 Drawing Sheets

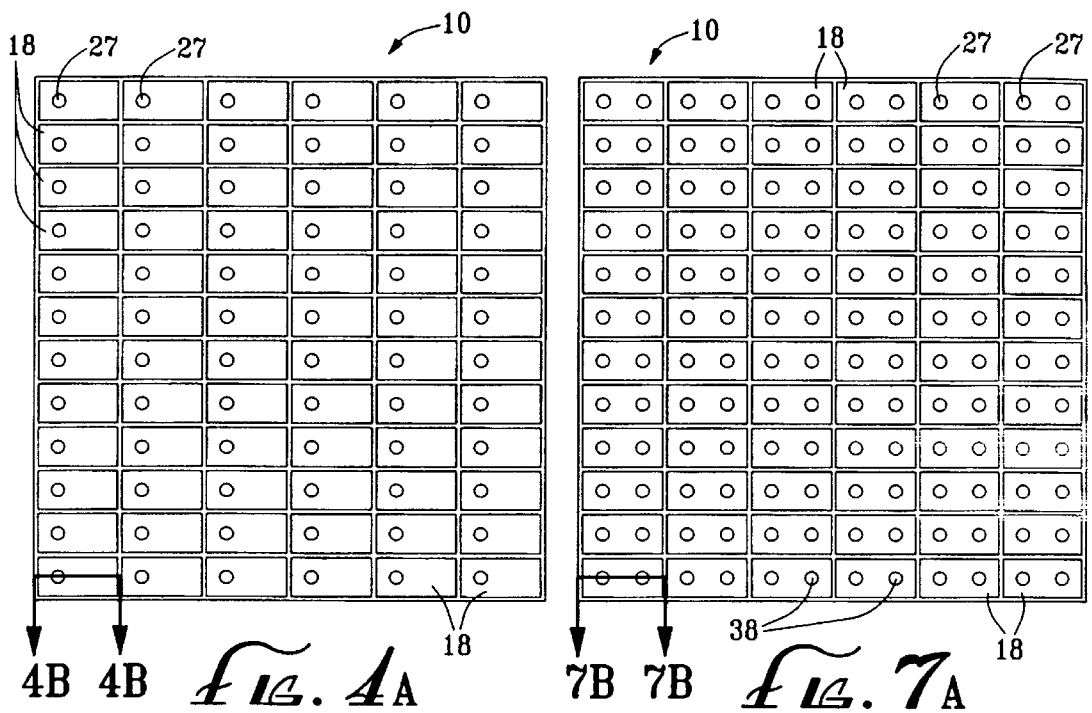
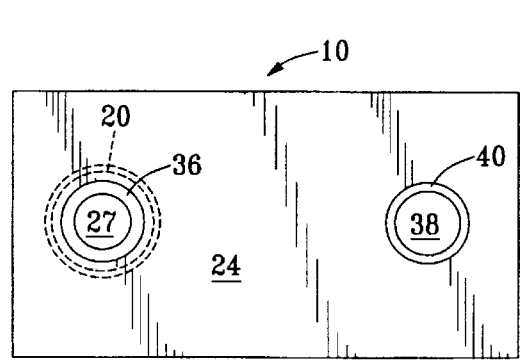
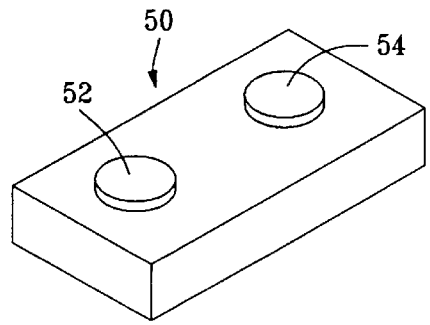

CONDUCTIVE POLYMER PTC BATTERY PROTECTION DEVICE AND METHOD OF MAKING SAME

CROSS-REFERENCE TO RELATED APPLICATION

This application claims the benefit, under 35 U.S.C. §119(e), of the filing date of co-pending provisional application Ser. No. 60/103,256; filed Oct. 6, 1998.

FEDERALLY SPONSORED RESEARCH OR DEVELOPMENT

Not Applicable

BACKGROUND OF THE INVENTION

The present invention relates broadly to the field of electronic components or devices that exhibit a positive temperature coefficient of resistivity, commonly referred to as "PTC" devices. More specifically, the present invention relates to a polymeric PTC device that is especially configured for the protection of batteries from excessive charging or draining currents.

Laminated polymeric electronic components, comprising a layer of polymeric material laminated between upper and lower metal foil layers, are well-known in the art. See, for example, U.S. Pat. No. 4,426,633—Taylor; U.S. Pat. No. 5,089,801—Chan et al.; U.S. Pat. No. 4,937,551—Plasko; and U.S. Pat. No. 4,787,135—Nagahori; U.S. Pat. No. 5,802,709—Hogge et al.; and International Publication No. WO97/06660. In such devices, the foil layers typically form electrodes, to which electrical contacts or leads are attached.

A class of polymeric electronic component that has become increasingly popular is that which employs a polymer that exhibits PTC characteristics. A particular application for polymer PTC components is in battery protection devices. In such devices, excessive charging or draining currents cause the polymer PTC material to increase in temperature to above the "switching temperature", at which its resistance increases sharply, so as to inhibit the current flow, thereby protecting the battery from damage.

Many types of electronic equipment are powered by dry cells of the AA or AAA type. It would be advantageous to provide a battery protection device that is specifically configured for use with such cells. Specifically, such a device would allow the cells to be efficiently packaged within the equipment, and would provide weldable contacts for the battery terminals.

SUMMARY OF THE INVENTION

Broadly, the present invention is a device for the protection of batteries, comprising a layer of conductive polymer PTC material laminated between upper and lower metal foil electrodes; a first contact element that is in electrical contact with the upper electrode while being electrically isolated from the lower electrode; and a second contact element, in substantially the same plane as the first contact element, in direct mechanical and electrical contact with the lower electrode. More specifically, the first contact element is electrically connected to the upper electrode by means of a conductive path provided through a through-hole or via that is formed through the polymeric layer and the upper and lower electrodes.

In a specific preferred embodiment, an upper electrode is laminated to the upper surface of a conductive polymer PTC layer, and a lower electrode is laminated to the lower surface of the conductive polymer PTC layer. A isolated portion of the lower electrode is formed by removing a predefined annular portion of the lower electrode, thereby creating an annular isolation gap separating the isolated portion from the rest of the lower electrode. A first via is formed through the upper electrode, the polymer PTC layer, and the isolated portion of the lower electrode, with an opening concentrically surrounded by the annular isolation gap. The diameter of the first via is smaller than the inside diameter of the isolated portion of the lower electrode, so that an annular area of the isolated electrode portion is left between the opening and the annular isolation gap. The internal wall surface of the first via and the annular isolated electrode area are plated with a conductive metallization layer. The metallization layer forms a first annular contact seat on the annular isolated electrode area that is conductively connected, by means of the metallized surface of the first via, with the upper electrode. A first contact element is conductively bonded to the first annular contact seat.

A predefined circular area of the lower electrode, spaced from the isolated portion, is plated with a conductive metallization layer. A second via, spaced from the first via, is formed through the upper electrode, the polymer PTC layer, and the metal-plated circular area of the lower electrode, with an opening in the metal-plated circular area. The diameter of the second via is smaller than that of the metal-plated circular area, so that a second annular contact seat is defined around the opening of the second via in the metal-plated circular area. A second contact element is conductively bonded to the second annular contact seat.

The first and second contact elements are dimensioned to establish electrical contact with the positive and/or negative terminal of a typical AA or AAA battery cell. Furthermore, the material and configuration of the contact elements allow the welding of battery terminals to the contact element surfaces.

The present invention provides a conductive path between the upper and lower electrodes through the polymer PTC layer at normal charging and draining currents. At such currents, the polymer PTC layer exhibits a relatively low resistance, since the current-generated heating of the polymer PTC layer is not sufficient to cause it to reach its switching temperature. In response to excessive charging or draining currents, the current-generated heat elevates the polymer PTC layer beyond its switching temperature, at which its resistance suddenly undergoes an increase of three or more orders of magnitude, thereby substantially reducing the current flow through the batteries so as to protect them from overcurrent conditions. When the temperature of the polymer PTC layer is reduced to below the switching temperature as a result of reduced current flow, the resistance of the polymer PTC layer reverts to its normal, low value, thereby allowing normal charging and draining of the batteries.

BRIEF DESCRIPTION OF THE DRAWINGS

FIG. 4A is a plan view of the laminate after a fourth principal step in the fabrication method has been completed;

FIG. 7A is a plan view, similar to that of FIG. 4A, showing the laminate after a seventh principal step in the fabrication method;

FIG. 8 is a plan view taken along the line 8—8 of FIG. 7B;

FIG. 10 is a perspective of the battery protection device of FIG. 9.

DETAILED DESCRIPTION OF THE PREFERRED EMBODIMENT

Figure 1:
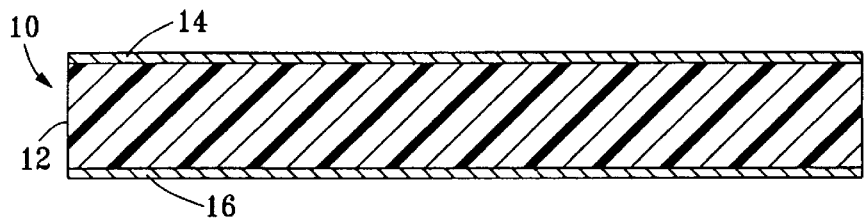
FIGS. 1–3 are cross-sectional views of a portion of a laminate comprising a conductive polymer PTC layer between upper and lower foil layers, showing the first three principal steps in the method of fabricating a battery protection device in accordance with a preferred embodiment of the present invention.
Figure 2:
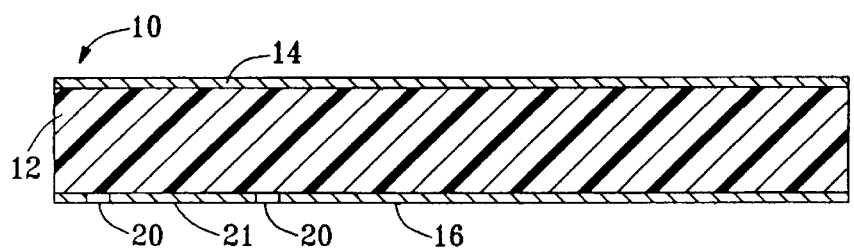

Referring now to the drawings, FIGS. 1 through 9 illustrate a method of fabricating a battery protection device in accordance with a preferred embodiment of the present invention. Referring first to FIG. 1, a laminate 10 is formed from a layer of conductive polymer PTC material 12 sandwiched between an upper foil layer 14 and a lower foil layer 16. The polymeric layer 12 may be made of any suitable conductive polymer composition, such as high density polyethylene (HDPE) into which is mixed an amount of carbon black that results in the desired operational characteristics, including PTC behavior. See, for example, International Publication No. WO97/06660 and U.S. Pat. No. 5,802,709, both assigned to the assignee of the subject invention, the disclosures of which are fully incorporated herein by reference. The foil layers 14, 16 are preferably nickel or nickel-plated copper, with nodularized surfaces in contact with the polymer layer 12 for improved adhesion, as is well-known in the art. Methods of forming the laminate 10 are disclosed in the aforementioned International Publication No. WO97/06660 and U.S. Pat. No. 5,802,709. The laminate 10 may advantageously be formed in a square sheet (FIGS. 4A, 7A) of approximately 10 cm on a side, or even larger.

The upper and lower foil layers 14, 16 of the laminate 10 are patterned, using standard photo-resist and etching methods, to delineate an array of discrete areas 18, each of which defines an individual device, as shown in FIGS. 4A and 7A. The ensuing description will refer to a single one of the areas 18, with the understanding that all of the areas 18 undergo the same fabrication process steps at the same time.

Figure 3:
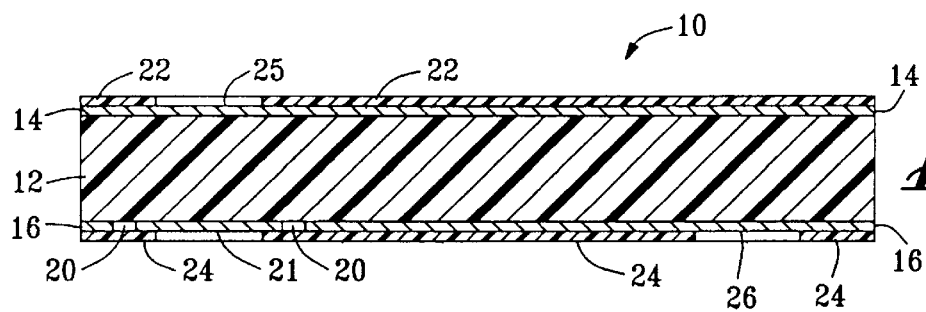

Simultaneously with the delineation of the areas 18, the photo-resist and etching techniques are employed to create an annular isolation gap 20 (FIG. 2) on the lower surface of the polymer PTC layer 12 by removing a predefined annular portion of the lower foil layer 16. The annular isolation gap 20 surrounds and isolates a first circular area that forms an isolated portion 21 of the lower foil layer 16 which surrounds the gap 20. Next, as shown in FIG. 3, an upper insulation layer 22 is applied to the upper foil layer 14, and a lower insulation layer 24 is applied to the lower foil layer 16. The insulation layers 22, 24, which are preferably of a heat-curable glass glaze or an polymeric material, may typically be screen printed onto the respective foil layers, then cured. The upper insulation layer 22 is patterned so as to leave a circular area 25 of the upper foil layer 14 exposed. The exposed circular area 25 of the upper foil layer 14 is coaxially aligned with the isolated portion 21 of the lower foil layer 16. The lower insulation layer 24 is patterned so as to cover the annular isolation gap 20 of lower surface of the polymer layer 12, and also a peripheral annular portion of the isolated portion 21 of the lower foil layer 16. Thus, a major central portion of the isolated portion 21 of the lower foil layer 16 is left exposed. Also left exposed by the lower insulation layer 24 is a second circular area 26 of the lower foil layer 16, spaced from the first circular area 21. The insulation layers 22, 24 provide insulative surfaces on both sides of the device, except for where the contact elements (as described below) are attached.

Figure 4B:
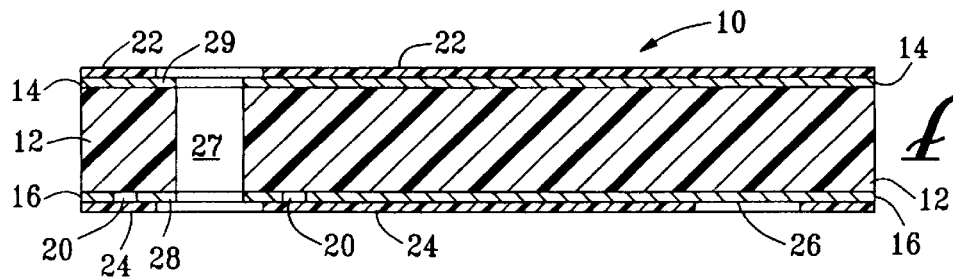
FIG. 4B is a cross-sectional view taken along line 4B—4B of FIG. 4A.

FIGS. 4A and 4B illustrate the formation of a first through-hole or via 27 that is formed through the exposed circular area 25 of the upper foil layer 14, the polymer layer 12, and the isolated portion 21 of the lower foil layer 16, whereby a circular opening is defined within the isolated portion 21 of the lower foil layer 16. The first via 27 is preferably formed by drilling, but it may also be formed by punching. As best seen in FIG. 4B, the diameter of the first via 27 is less than the diameter of the isolated portion 21 of the lower foil layer 16, so that a first annular lower collar 28 of foil material is left around the lower opening of the first via 27 in the isolated portion 21 of the lower foil layer 16. Likewise, the diameter of the first via 27 is less than the diameter of the exposed circular area 25 of the upper foil layer 14, so that an annular upper collar 29 of exposed foil is left around the upper opening of the first via 27 in the exposed circular area 25 of the upper foil layer 14. Nevertheless, the diameter of the first via 27 should be large enough (e.g., about 5 mm) to accommodate a welding probe head for the welding of a battery terminal (not shown) to a contact element that is secured over the lower opening of the first via 27, as described below.

Figure 5:
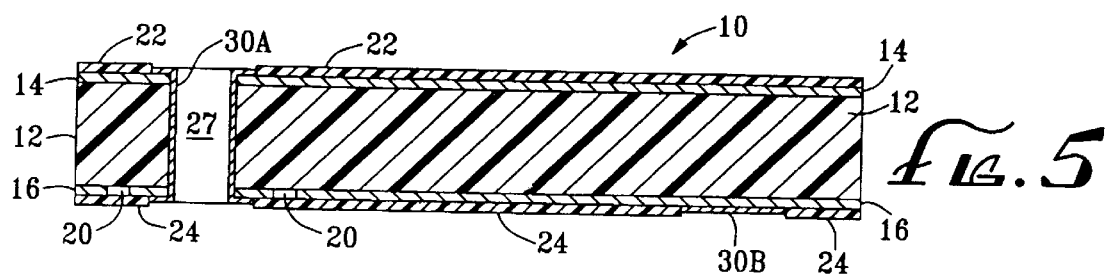
FIGS. 5 and 6 are cross-sectional views, similar to those of FIGS. 1–3, showing fifth and sixth principal steps in the fabrication method.

Next, as shown in FIG. 5, a first metallization layer preferably of electroplated copper or nickel, includes a first portion 30A that is formed on the interior wall surface of the first via 27, on the first annular lower foil collar 28, and on the upper annular foil collar 29. The first metallization layer also includes a second portion 30B that is formed on the second circular exposed area 26 of the lower foil layer 16. The first portion 30A of the first metallization layer establishes physical and electrical contact between the upper foil layer 14 and the first lower annular foil collar 28 that is isolated from the lower foil layer 16 by the annular isolation gap 20.

Figure 6:
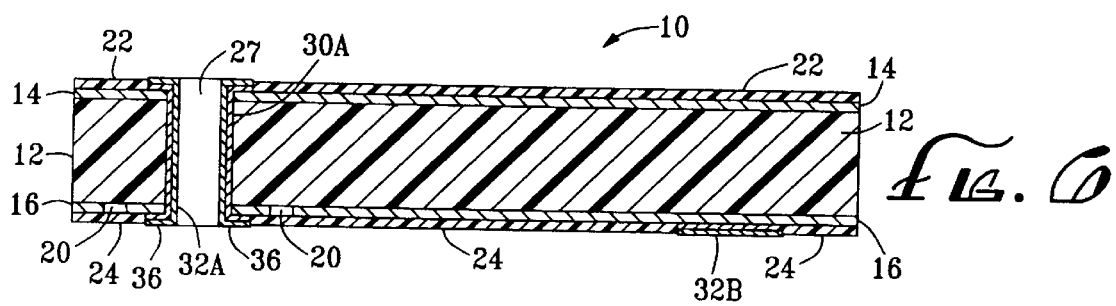

A second metallization layer is then formed, as shown in FIG. 6. The second metallization layer, which is preferably of solder, and which can be applied by any suitable method, has two portions: a first portion 32A that conforms to and overlies the first portion 30A of the first metallization layer 30, and a second portion 32B that is applied over the second portion 30B of the first metallization layer that covers the second circular foil area 26 of the lower foil layer 16. If the second metallization layer 32A, 32B, is of solder, it won't adhere well to polymeric materials. Thus, the first metallization layer 30A, 30B provides a medium by which the conforming portion 32A of the second metallization layer can adhere to the interior wall surface of the first via 27.

It will be seen that the first and second metallization layers provide an electrically conductive path between the upper annular foil collar 29 of the upper foil layer 14 and the first lower annular foil collar 28 of the lower foil layer 16. The metal-plated first lower annular collar thus defines a first annular contact seat 36 that is electrically connected to the upper foil layer 14, while being isolated from the lower foil layer 16 by the annular isolation gap 20.

Figure 7B:
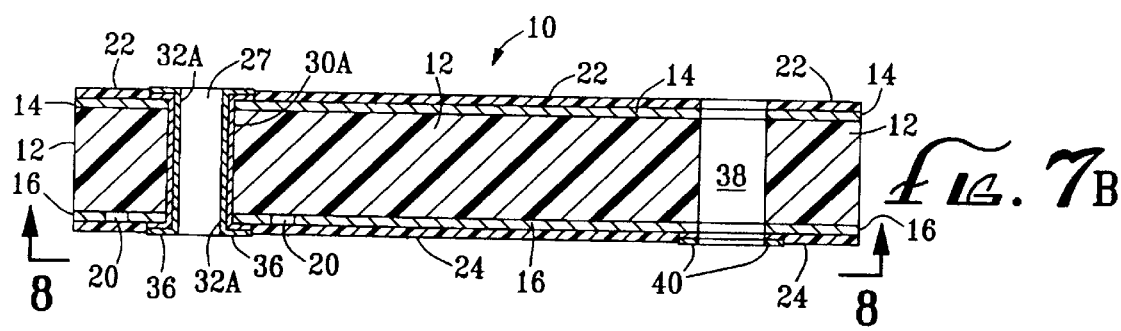
FIG. 7B is a cross-sectional view taken along line 7B—7B of FIG. 7A.

FIGS. 7A and 7B illustrate the step of forming a second through-hole or via 38 through the laminate 10, from an upper opening in the upper foil layer 14 to a lower opening in the second circular area 26 of the lower foil layer 16 that has been overlaid by the second portions 30B, 32B of the first and second metallization layers, respectively. The second via 38, like the first via 27, is preferably formed by drilling, but it may also be formed by punching. The diameter of the second via 38 is less than the diameter of the second circular area 26, so that a second annular contact seat 40 is defined by an annular remnant of the metallized circular foil area 26 surrounding the lower opening of the second via 38. Also, like the first via 27, the second via 38 must have a diameter large enough (e.g., about 5 mm) to accommodate a welding probe head for welding a battery terminal (not shown) to a contact element secured over the lower opening of the second via 38, as described below.

Figure 9:
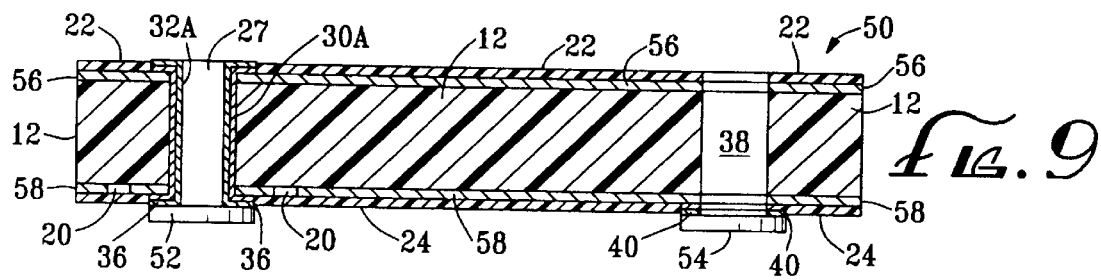
FIG. 9 is a cross-sectional view of a completed battery protection device in accordance with a preferred embodiment of the present invention.

FIGS. 9 and 10 show a finished battery protection device 50 after first and second disc-shaped conductive contact elements 52, 54 have been respectively fixed to the first and second annular conductive seats 36, 40, thereby covering the lower openings of the first an second vias 27, 38, respectively. The attachment of the contact elements 52, 54 is preferably accomplished by reflowing the solder of the second metallization layer that forms the first and second conductive seats 36, 40. The contact elements 52, 54 are preferably made of nickel, or nickel-plated copper, or some other durable, conductive metal that can be secured by a solder joint.

After attachment of the contact elements 52, 54, the individual devices 50 are singulated from the sheet 10 by conventional methods, such as sawing. In each individual battery protection device 50, as shown in FIGS. 9 and 10, the upper foil layer provides an upper electrode 56 on the upper surface of a laminar conductive polymer PTC element 12, and the lower foil layer provides a lower electrode 58 on the lower surface of the PTC element 12. The first contact element 52 is electrically connected to the upper electrode 56 by the first annular contact seat 36 and the first portions 30A, 32A of the first and second metallization layers, respectively, through the first via 27. The first contact element 52 is isolated from the lower electrode 58, however, by the isolation gap 20. The second contact element 54 is electrically connected to the lower electrode by the second annular contact seat 40.

The first and second contact elements 52, 54 are configured so that the terminals of typical miniature single-cell batteries (e.g., AA or AAA cells) can be directly welded to them by welding probe heads inserted through the vias 27, 38, as mentioned above. Furthermore, the overall dimensions of the device 50 are selected so as to accommodate the batteries in the smallest practical space. For example, a device 50 configured to accommodate two AAA cells would have a length of about 20 mm and a width of about 10 mm.

While a preferred embodiment of the invention has been described above, several variations and modifications may suggest themselves to those skilled in the pertinent arts. Such variations and modifications are considered to be within the spirit and scope of the invention, as defined in the claims that follow.

What is claimed is:

1. A device for the protection of batteries, comprising:
    a conductive polymer PTC layer having first and second opposed surfaces;
    a first electrode laminated to the first surface, and a second electrode laminated to the second surface;
    an isolation gap surrounded by and in the second electrode that defines and surrounds an isolated portion of the second electrode;
    a via extending through the first electrode, the conductive polymer PTC layer, and the isolated portion of the second electrode;
    a first contact element on the isolated portion of the second electrode, the first contact element being electrically connected to the first electrode by a metallization layer connecting the first electrode to the isolated portion of the second electrode through the via; and
    a second contact element on the second electrode and separated from the first contact element by the isolation gap.

2. The device of claim 1, wherein the metallization layer forms an annular conductive contact seat on the isolated portion of the lower electrode, and wherein the first contact element is fixed to the contact seat.

3. The device of claim 2, wherein the second contact element is fixed to the lower electrode at a location that is electrically isolated from the isolated portion by the isolation gap.

4. The device of claim 3, wherein the via is a first via and the contact seat is a first contact seat, the device further comprising:
    a second via formed through the upper electrode, the conductive polymer PTC layer, and the lower electrode, whereby a second annular conductive contact seat is formed on the lower electrode around the second via;
    wherein the second contact element is fixed to the second contact seat.

\* \* \* \* \*